United States Patent
Moeller et al.

(10) Patent No.: US 7,643,761 B2
(45) Date of Patent: Jan. 5, 2010

(54) METHOD AND APPARATUS FOR PROCESSING OPTICAL DUOBINARY SIGNALS

(75) Inventors: Lothar Benedict Erhard Josef Moeller, Middletown, NJ (US); Chongjin Xie, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 565 days.

(21) Appl. No.: 10/782,231

(22) Filed: Feb. 19, 2004

(65) Prior Publication Data

US 2005/0185969 A1 Aug. 25, 2005

(51) Int. Cl.
H04B 10/06 (2006.01)

(52) U.S. Cl. .................. 398/202; 398/155

(58) Field of Classification Search ............ 398/155, 398/202

See application file for complete search history.

(56) References Cited

U.S. PATENT DOCUMENTS

| | | | |
|---|---|---|---|
| 4,144,565 A | 3/1979 | Bouknecht et al. | |
| 4,780,888 A | 10/1988 | Solhjell et al. | |
| 5,351,271 A | 9/1994 | Coquerel | 375/224 |
| 5,453,826 A | 9/1995 | Sugimoto et al. | |
| 5,774,064 A | 6/1998 | Lambropoulos et al. | |
| 5,777,765 A | 7/1998 | Deloddere | |
| 5,867,534 A | 2/1999 | Price et al. | 375/286 |
| 6,188,497 B1 * | 2/2001 | Franck et al. | 398/183 |
| 6,295,152 B1 | 9/2001 | Wedding | 398/209 |
| 6,778,589 B1 | 8/2004 | Ishii | 375/136 |
| 6,839,130 B2 | 1/2005 | Araki et al. | |
| 7,142,621 B2 | 11/2006 | Vallet et al. | 375/355 |
| 7,173,993 B2 * | 2/2007 | Engl et al. | 375/355 |

2003/0002833 A1  1/2003  Futami et al.

(Continued)

FOREIGN PATENT DOCUMENTS

DE    198 23 705 A1    12/1999

(Continued)

OTHER PUBLICATIONS

Singh, A. "Modulating Pulses in Long-Haul Optics Systems." CommsDesign. Feb. 7, 2002. viewed on Oct. 15, 2007 <http://www.commsdesign.com/article/printableArticle.jhtml?articleID=16504367>.*

(Continued)

Primary Examiner—Leslie Pascal
(74) Attorney, Agent, or Firm—Mendelsohn, Drucker & Associates, P.C.; Yuri Gruzdkov; Steve Mendelsohn (57) ABSTRACT

An optical receiver adapted to apply multiple-sampling processing to an optical duobinary signal received over a transmission link in an optical communication system. In one embodiment, the receiver has an optical-to-electrical signal converter coupled to a decoder adapted to process an electrical signal generated by the converter to generate a bit sequence corresponding to the optical signal. To generate a bit value, the decoder first obtains two or more bit estimate values by sampling the electrical signal within a corresponding signaling interval two or more times. The decoder then applies a logical function to the bit estimate values, which produces the corresponding bit value for the bit sequence. Advantageously, embodiments of the present invention improve overall back-to-back (i.e., source-to-destination) system performance, e.g., by reducing the number of decoding errors associated with timing jitter and/or spontaneous beat noise in the received optical signal.

20 Claims, 8 Drawing Sheets

U.S. PATENT DOCUMENTS

| | | | |
|---|---|---|---|
| 2003/0170022 A1 | 9/2003 | Moeller | 398/209 |
| 2004/0071247 A1 | 4/2004 | Dunning et al. | 375/355 |
| 2004/0091273 A1 | 5/2004 | Brissette et al. | |
| 2004/0151511 A1 | 8/2004 | Gill et al. | |
| 2005/0185969 A1 | 8/2005 | Moeller et al. | 398/202 |
| 2005/0232644 A1* | 10/2005 | Moeller | 398/202 |

FOREIGN PATENT DOCUMENTS

| | | |
|---|---|---|
| EP | 0 508 885 A2 | 10/1992 |
| WO | WO 85/05234 | 11/1985 |

OTHER PUBLICATIONS

Weik, Martin H. "return to zero". Fiber Optics Standard Dictionary. 3rd ed. 1997.*

"Reduced Driving Voltage Optical Duobinary Transmitter and Its Impact on Transmission Performance Over Standard Single-Mode Fiber," by J.M. Gené, et al., IEEE Photonics Technology Letters, vol. 14, No. 6, Jun. 2002, pp. 843-845.

"Reduced Complexity Optical Duobinary 10-Gb/s Transmitter Setup Resulting in an Increased Transmission Distance," by W. Kaiser, et al., IEEE Photonics Technology Letters, vol. 13, No. 8, Aug. 2001, pp. 884-886.

"Optical Duobinary Transmission System Featuring Improved Receiver Sensitivity and Reduced Optical Bandwidth," by Hoon Kim and Charles X. Yu, IEEE Photonics Technology Letters, vol. 14, No. 8, Aug. 2002.

"Enhanced Phase-Shaped Binary Transmission for Dense WDM Systems," by H. Bissessur, et al., Electronics Letters, vol. 37, No. 1, Jan. 2001, pp. 45-46.

"Dispersion-Tolerant Optical Transmission System Using Duobinary Transmitter and Binary Receiver," by Kazushige Ynenaga et al., Journal of Lightwave Technology, IEEE. New York, US, ISSN: 0733-8724, vol. 15, No. 8, Aug. 1997, pp. 1530-1537.

* cited by examiner

FIG. 8B

METHOD AND APPARATUS FOR PROCESSING OPTICAL DUOBINARY SIGNALS

CROSS-REFERENCE TO RELATED APPLICATIONS

The subject matter of this application is related to that of U.S. patent application Ser. No. 10/730,413, filed Dec. 8, 2003, which is incorporated herein by reference.

BACKGROUND OF THE INVENTION

1. Field of the Invention

The present invention relates to optical communication equipment and, more specifically, to equipment for processing optical duobinary signals.

2. Description of the Related Art

Duobinary signaling was introduced in the 1960s and since then has found numerous applications in communication systems. The principle of duobinary signaling is explained, for example, in an article by A. Lender that appeared in IEEE Transactions on Communications and Electronics, Vol. 82 (May, 1963), pp. 214-218, the teachings of which are incorporated herein by reference. Briefly, duobinary signaling uses three signal levels, for example, "+1", "0", and "−1". A signal corresponding to one of these levels (i.e., a duobinary symbol) is transmitted during each signaling interval (time slot). A duobinary signal is typically generated from a corresponding binary signal using certain transformation rules. Although both signals carry the same information, the bandwidth of the duobinary signal may be reduced by a factor of 2 compared to that of the binary signal. In addition, the duobinary signal may be constructed such that it has certain inter-symbol correlation (ISC) data, which can be used to implement an error-correction algorithm at the receiver.

In optical communication systems, duobinary encoding is typically implemented using phase modulation of a carrier optical beam as disclosed in U.S. Pat. No. 5,867,534, the teachings of which are incorporated herein by reference. More specifically, for the "0" bit, substantially no light is transmitted. However, the "+1" and "−1" bits are transmitted as light having +E and −E electric fields, respectively, where opposite polarities of the electric field correspond to a relative optical phase shift of 180 degrees. While an optical beam modulated in this manner is a three-level signal in terms of the electric field, it is a two-level signal in terms of the optical power. Based on this property of duobinary signals, a "binary" receiver may be adapted to serve as a duobinary receiver. A conventional binary receiver simply measures optical power. Since both "+1" and "−1" duobinary states correspond to light "on", a binary receiver can convert optical duobinary input signals into electrical output signals by measuring optical power. However, it would be desirable to have a specialized duobinary receiver, which, when deployed in a communication system in place of a regular binary receiver, would improve the system performance using advantages of optical duobinary coding.

SUMMARY OF THE INVENTION

Problems in the prior art are addressed, in accordance with the principles of the present invention, by an optical receiver adapted to apply multiple-sampling processing to an optical duobinary signal received over a transmission link in an optical communication system. In one embodiment, the receiver has an optical-to-electrical signal converter coupled to a decoder adapted to process an electrical signal generated by the converter to generate a bit sequence corresponding to the optical signal. To generate a bit value, the decoder first obtains two or more bit estimate values by sampling the electrical signal within a corresponding signaling interval two or more times. The decoder then applies a logical function to the bit estimate values, which produces the corresponding bit value for the bit sequence. Advantageously, embodiments of the present invention improve overall back-to-back (i.e., source-to-destination) system performance, e.g., by reducing the number of decoding errors associated with timing jitter and/or spontaneous beat noise in the received optical signal.

According to another embodiment, the present invention is a method of signal processing, comprising: converting an optical signal into an electrical signal having an amplitude corresponding to optical power of the optical signal; sampling the electrical signal using two or more sampling windows to generate two or more bit estimate values; and applying a logical function to the two or more bit estimate values to generate a bit sequence corresponding to the optical signal.

According to yet another embodiment, the present invention is an optical communication system, comprising an optical receiver coupled to an optical transmitter via a transmission link, wherein the optical receiver comprises: a signal converter adapted to convert an optical signal into an electrical signal having an amplitude corresponding to optical power of the optical signal; and a decoder coupled to the signal converter and adapted to: (i) sample the electrical signal using two or more sampling windows to generate two or more bit estimate values; and (ii) apply a logical function to the two or more bit estimate values to generate a bit sequence corresponding to the optical signal.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
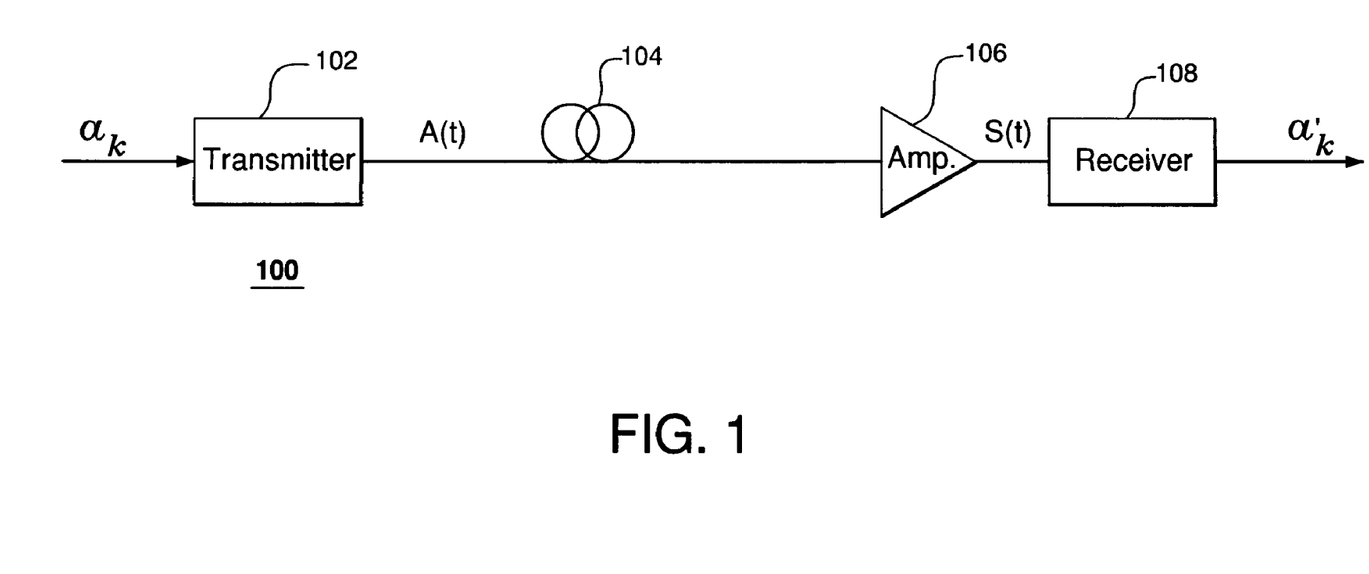
FIG. 1 shows a block diagram of a representative optical communication system adapted to use optical duobinary coding.

FIG. 1 shows a block diagram of a representative optical communication system 100 adapted to use optical duobinary coding. System 100 has a duobinary transmitter 102 coupled to a receiver 108 via a transmission link having an optical fiber 104 and one or more optical amplifiers 106. Transmitter 102 receives a binary sequence, $\alpha_k$, and generates a corresponding optical duobinary signal, A(t), which is received as signal S(t) at receiver 108. Compared to signal A(t), signal S(t) may have distortions due to chromatic dispersion (CD) and polarization mode dispersion (PMD) in fiber 104 and/or amplification noise in amplifier 106. Receiver 108 converts optical signal S(t) into a corresponding electrical signal and processes that signal to generate binary sequence $\alpha'_k$, corresponding to sequence $\alpha_k$.

Descriptions of duobinary transmitters that can be used as transmitter 102 can be found, for example, in the following articles: (1) J. M. Gene et al., IEEE Photonics Technology Letters, 2002, vol. 14, p. 843; (2) W. Kaiser et al., IEEE Photonics Technology Letters, 2001, vol. 13, p. 884; (3) H. Kim and C. X. Yu, IEEE Photonics Technology Letters, 2002, vol. 14, p. 1205; and (4) H. Bissessur, Electronics Letters, 2001, vol. 37, p. 45, the teachings of all of which are incorporated herein by reference.

Figure 2:
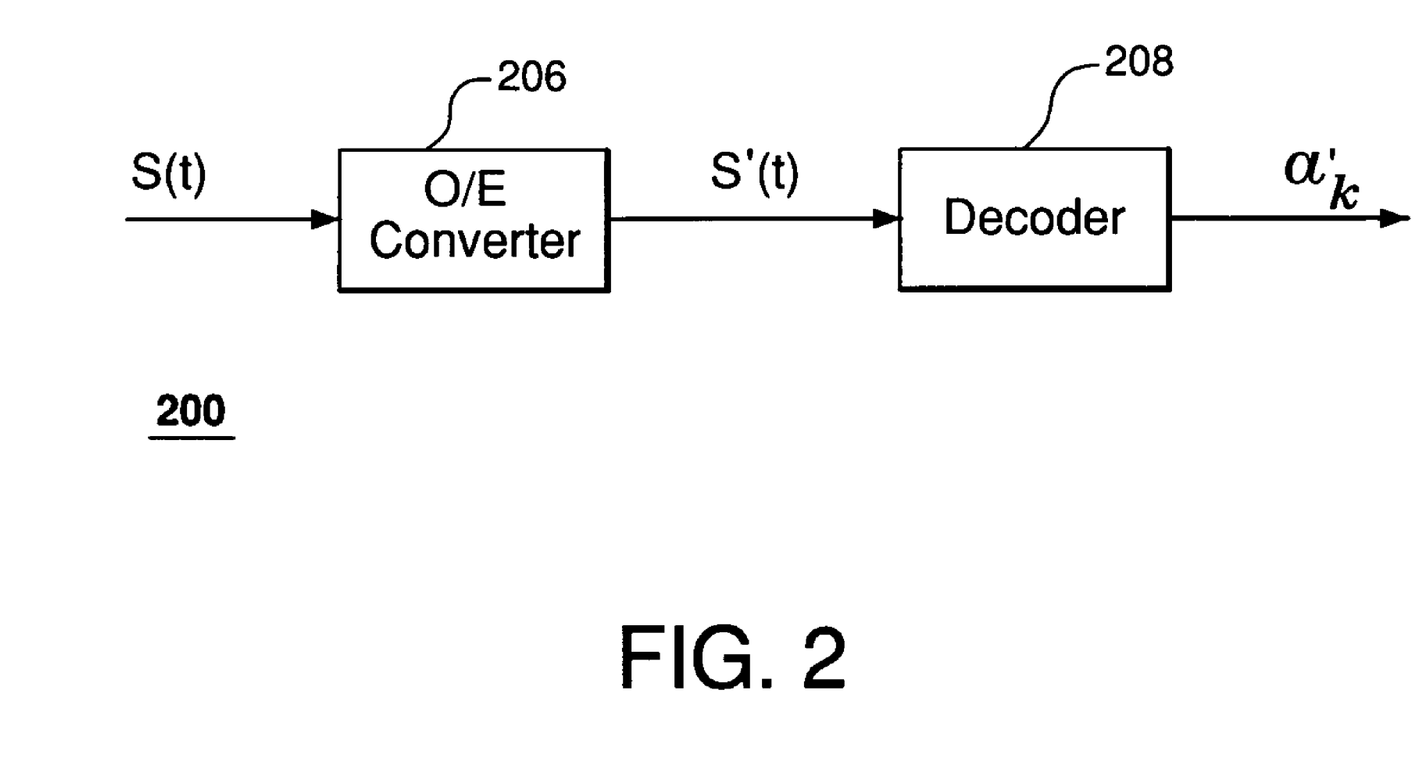
FIG. 2 shows a block diagram of a representative receiver that can be used in the system of FIG. 1.

FIG. 2 shows a block diagram of a receiver 200 that can be used as receiver 108 in system 100. Receiver 200 has an optical-to-electrical (O/E) signal converter (e.g., a photodiode) 206 that converts optical signal S(t) into electrical signal S'(t) whose amplitude is proportional to the optical power of signal S(t). A decoder 208 samples signal S'(t), e.g., by integrating it over a fraction of each bit length termed a "sampling window," and compares the integration result with a decision threshold value. Based on the comparison, decoder 208 outputs either digital "1" or digital "0" for sequence $\alpha'_k$. Optimal performance of decoder 208 is achieved when both the width of the sampling window and the decision threshold value are appropriately selected to minimize the number of decoding errors arising from the presence of distortions and noise in signal S'(t).

Figure 3A:
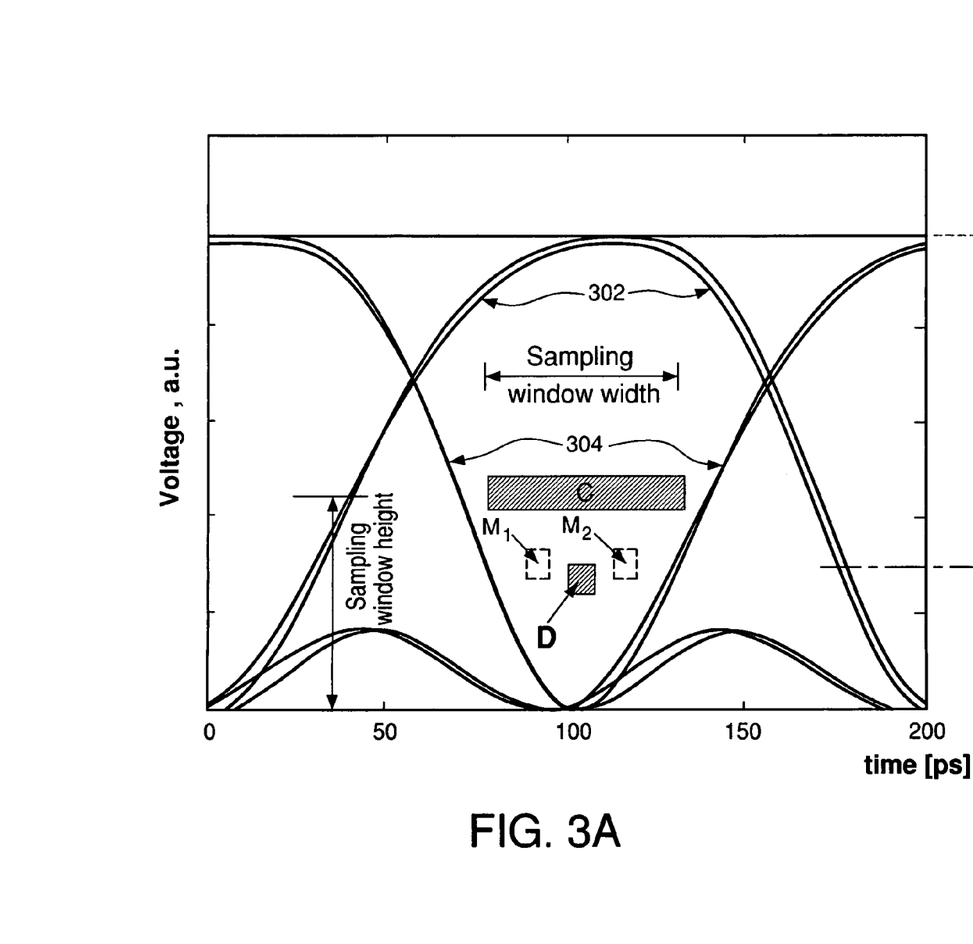
FIGS. 3A-B show a representative eye diagram of a (10 Gb/s) duobinary signal and the corresponding noise distribution function, respectively, in the system of FIG. 1.
Figure 3B:
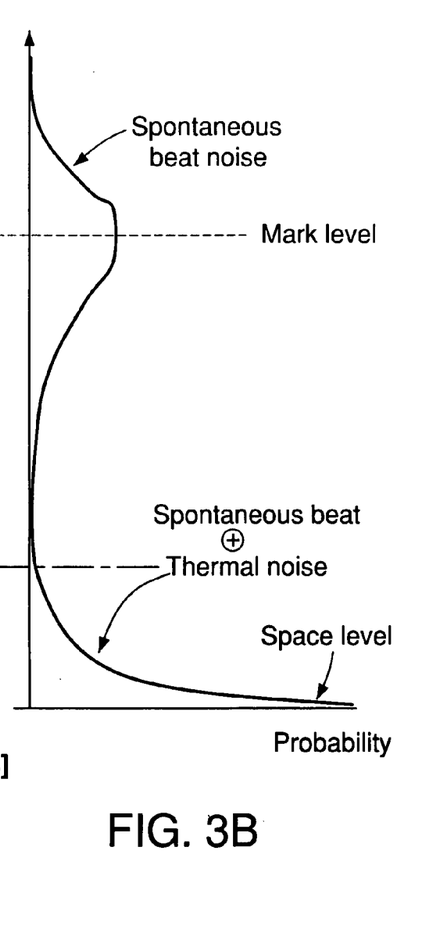

FIGS. 3A-B show a representative eye diagram of (10 Gb/s) signal S(t) and the corresponding noise distribution function, respectively, in system 100. Referring to FIG. 3A, the eye diagram shows different waveforms that may be transmitted in system 100 over a time interval corresponding to two bit periods. For example, waveform 302 having a relatively broad pulse centered at about 100 ps corresponds to a "010" binary sequence. Similarly, waveform 304 having a relatively narrow valley centered at about 100 ps corresponds to a "101" binary sequence. One skilled in the art will appreciate that other waveforms shown in FIG. 4A correspond to "111", "110", "100", "000", "001", and "011" bit sequences. Referring to FIG. 3B, at the "mark" level (i.e., the level corresponding to binary "1"), the total noise is dominated by the spontaneous beat noise in optical amplifiers, e.g., amplifiers 106 (FIG. 1). At the "space" level (i.e., the level corresponding to binary "0"), the total noise is dominated by a sum of thermal and spontaneous beat noise. However, in the region between the mark and space levels, there usually exists a region of relatively low noise probability corresponding to a minimum of the noise distribution function.

As already indicated above, to configure decoder 208, one has to select the width of the sampling window and a decision threshold value. FIGS. 3A-B graphically illustrate these selections made in accordance with a prior-art processing method, the method disclosed in the above-referenced U.S. patent application Ser. No. 10/730,413, and one embodiment of the present invention. More specifically, sampling window C corresponds to a prior-art configuration of decoder 208, sampling window D corresponds to a configuration disclosed in the '413 application, and sampling windows M1-M2 correspond to one embodiment of the present invention.

In a typical prior-art configuration, the sampling window has a relatively large width, e.g., greater than 30% of the bit length. One consideration for choosing a relatively large width value is that longer integration times typically provide noise averaging, which can reduce decoding errors. It is generally believed that setting a relatively narrow sampling window will reduce the benefits of noise averaging and detrimentally affect performance of receiver 200. However, for signals affected by dispersion, using a relatively wide sampling window increases decoding errors, e.g., due to wrong interpretation of zeros in "101" binary fragments. For similar reasons, analogous decoding errors may be caused by dispersion-free signals utilizing relatively large duty-cycle values, e.g., greater than 1 (see FIG. 3A).

Referring again to FIG. 3A, waveform 304 has a relatively narrow valley between two relatively broad pulses. When sampling window C is used, the integration result corresponding to waveform 304 may have a relatively large contribution from the part of the waveform corresponding to the trailing edge of the preceding optical "1" and the part of the waveform corresponding to the leading edge of the next optical "1". This increases the probability of decoding errors because, even in the absence of noise, the gap between the decision threshold value and the integration result of waveform 304 is relatively narrow. The contribution of noise may then easily cause the integration result to overshoot the decision threshold value, thereby causing a decoding error for waveform 304. However, an increase of the decision threshold value for sampling window C will narrow the gap between the decision threshold value and the noise-free integration result of waveform 302. The contribution of signal spontaneous beat noise (FIG. 3B) may then cause the integration result to undershoot the decision threshold value, thereby causing a decoding error for waveform 302. Thus, attempts to reduce said errors by simply adjusting the decision threshold value for sampling window C are largely ineffective.

As demonstrated in the '413 application, contrary to general expectations, the number of decoding errors in decoder 208 can be reduced for duobinary signals by decreasing the sampling window width and properly aligning said window with respect to the waveforms of the signal. For example, when sampling window D is used for waveform 304 (FIG. 3A), the contribution into the integration result from the part of the waveform corresponding to the trailing edge of the preceding optical "1" and the part of the waveform corresponding to the leading edge of the next optical "1" is significantly reduced compared to the configuration where sampling window C is used. This decreases the probability of decoding errors because the gap between the decision threshold value and the integration result of noise-free waveform 304 can now be relatively large. Consequently, it becomes more difficult for the contribution of noise to cause the integration result to overshoot the decision threshold value, which reduces the number of decoding errors. In addition, the decision threshold value itself may now be selected to correspond to the "low noise" region without incurring a relatively large penalty from the trailing/leading edges of the adjacent optical "ones." As a result, the overall contribution of noise into the integration result is reduced. Furthermore, the gap between the decision threshold value and the noise-free integration result of waveform 302 is relatively wide. Therefore, it becomes more difficult for the contribution of signal spontaneous beat noise (FIG. 3B) to cause said integration result to undershoot the decision threshold value, which further reduces the number of decoding errors.

As will be demonstrated below, the number of decoding errors in decoder 208 can be reduced even further by utilizing two relatively short sampling windows and applying an appropriate logical function to bit estimate values corresponding to those windows. For example, when sampling windows M1 and M2 (FIG. 3A) are used, two integration results are obtained. By appropriately choosing the widths of sampling windows M1 and M2 and placing them in the vicinity of sampling window D, most of the above-described sampling benefits corresponding to sampling window D are retained for each sampling window. An additional improvement is then derived from further processing of the integration results obtained with sampling windows M1-M2. More specifically, each of the integration results is first compared with a corresponding decision threshold value to produce a bit estimate value. The bit estimate value is a binary "1", when the integration result is greater than or equal to the decision threshold value, and a binary "0", when the integration result is smaller than the decision threshold value. Then, a logical "AND" function is applied to the bit estimate values to produce the final bit value to be output from the decoder.

The choice of logical function applied to the bit estimate values corresponding to sampling windows M1 and M2 is primarily determined by the type of error-causing impediment to the optical signal. For example, as already indicated above, for the eye diagram of FIG. 3A, most decoding errors are related to false binary "ones" attributed to waveform 304. In this situation, the "AND" function is an appropriate function choice because it returns a "0" whenever at least one of the bit estimate values is "0". In a different situation, e.g., when most decoding errors are related to false binary "zeros" attributed to waveform 302, the "OR" function would be an appropriate function choice. One skilled in the art will appreciate that, depending on the type of impediment and/or waveform shape, other logical functions or other numbers (e.g., three or more) of sampling windows may similarly be employed. For example, the present invention may be implemented with three sampling windows, wherein (i) an "OR" function is applied to the bit estimate values corresponding to two of these sampling windows and (ii) an "AND" function is applied to the bit estimate value corresponding to the third sampling window and the value returned by the "OR" function to produce the final bit value to be output from the decoder.

Figure 4A:
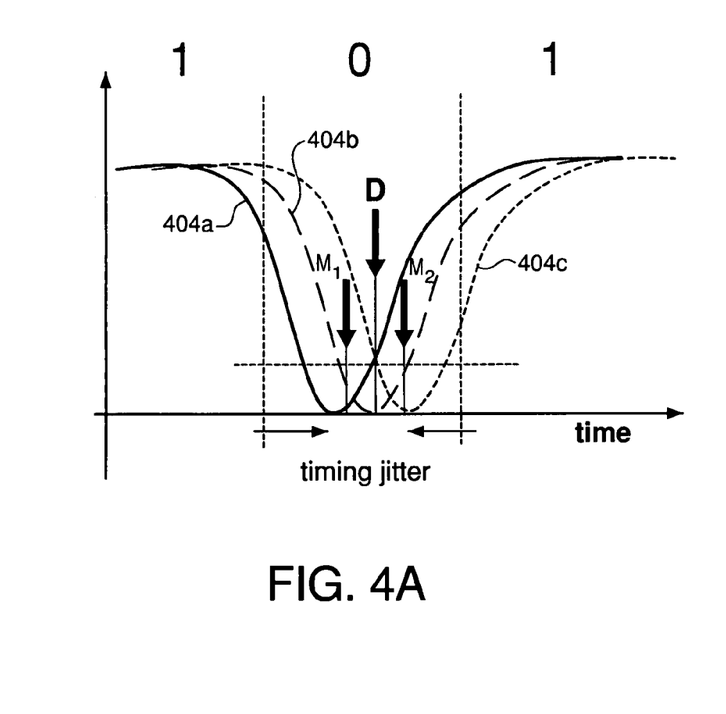
FIGS. 4A-B graphically illustrate error reduction achieved in accordance with one embodiment of the invention, when timing jitter or noise distortions are present in the signal shown in FIG. 3A.
Figure 4B:
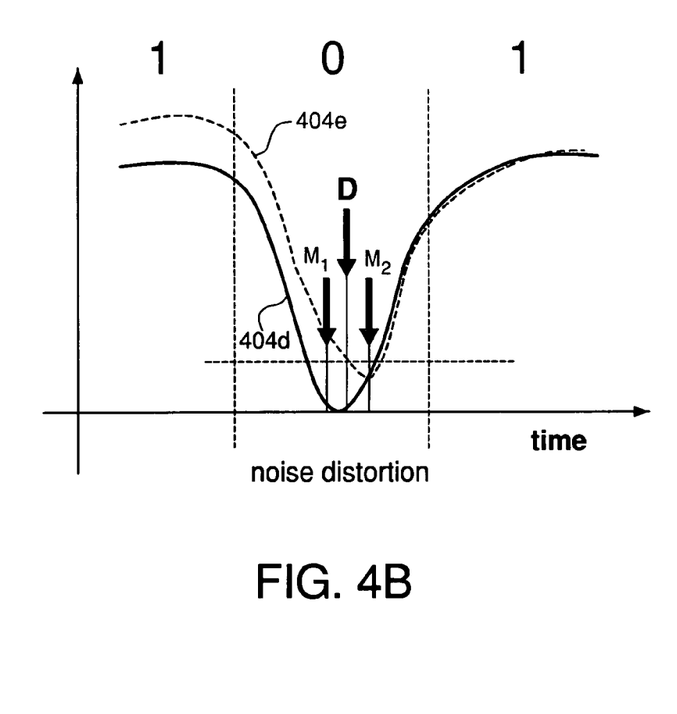

FIGS. 4A-B graphically illustrate error reduction achieved with one possible configuration of decoder 208 utilizing sampling windows M1 and M2 with respect to a configuration utilizing sampling window D. More specifically, FIGS. 4A and 4B illustrate error reduction in the presence of timing jitter and noise distortions, respectively.

FIG. 4A shows three waveforms 404a-c, each of which is similar to waveform 304 of FIG. 3A. Waveform 404b is practically centered within the time slot corresponding to the "zero" bit and corresponds to substantially no timing jitter. In contrast, waveforms 404a and 404c are displaced with respect to waveform 404b by negative and positive timing jitter, respectively. The arrows in FIG. 4A indicate respective positions of sampling windows D and M1-M2 (see also FIG. 3A). For illustration purposes, it is assumed that there is a common decision threshold value for all three sampling windows indicated by the horizontal dashed line. To graphically compare an integration result corresponding to a particular window with the decision threshold value, one can simply project the arrow onto a waveform and note the position of the crossing point of the projection with respect to the dashed decision threshold line. For example, when the crossing point is above the dashed line, the integration result exceeds the decision threshold value. Similarly, when the crossing point is below the dashed line, the integration result is smaller than the decision threshold value.

As can be seen in FIG. 4A, in the absence of jitter (waveform 404b), all three sampling windows produce integration results that are below the decision threshold value. This yields a correct decoding result, i.e., binary "0", at the output of the decoder for both decoder configurations. However, in the presence of jitter, the configuration corresponding to sampling window D produces a decoding error, while the configuration corresponding to sampling windows M1 and M2 is able to decode the signal correctly. More specifically, for either negative or positive jitter (waveforms 404a and 404c, respectively), sampling window D produces an integration result that is above the decision threshold value, which yields an erroneous "1" at the decoder output. This error is avoided with the configuration corresponding to sampling windows M1 and M2 as follows. For waveform 404a, the integration result for sampling window M1 is below the decision threshold value, while the integration result for sampling window M2 is above that value. Consequently, bit estimate values of "0" and "1" for sampling windows M1 and M2, respectively, are generated. Application of the "AND" function to these bit estimate values returns a binary "0", which is a correct decoding result. Analogously, for waveform 404c, the integration result for sampling window M2 is below the decision threshold value, while the integration result for sampling window M1 is above that value. Consequently, bit estimate values of "1" and "0" for sampling windows M1 and M2, respectively, are generated. Again, application of the "AND" function to these bit estimate values produces a correct decoding result.

FIG. 4B is similar to FIG. 4A and shows two waveforms 404d-e, each of which is similar to waveform 304 of FIG. 3A. Waveform 404d is substantially undistorted while waveform 404d is skewed due the presence of signal spontaneous beat noise for the leading optical "1". Similar to the decoding of waveform 404b, decoding of waveform 404d yields a correct result, i.e., binary "0", for both decoder configurations. However, for waveform 404e, the configuration corresponding to sampling window D produces a decoding error, while the configuration corresponding to sampling windows M1 and M2 avoids that error. More specifically, for waveform 404e, sampling window D produces an integration result that is above the decision threshold value, which yields an erroneous "1" at the decoder output. However, the integration results for sampling window M1 and M2 are above and below the decision threshold value, respectively. Consequently, bit estimate values of "1" and "0" are generated. Application of the "AND" function then yields a binary "0", which is a correct decoding result.

Figure 5:
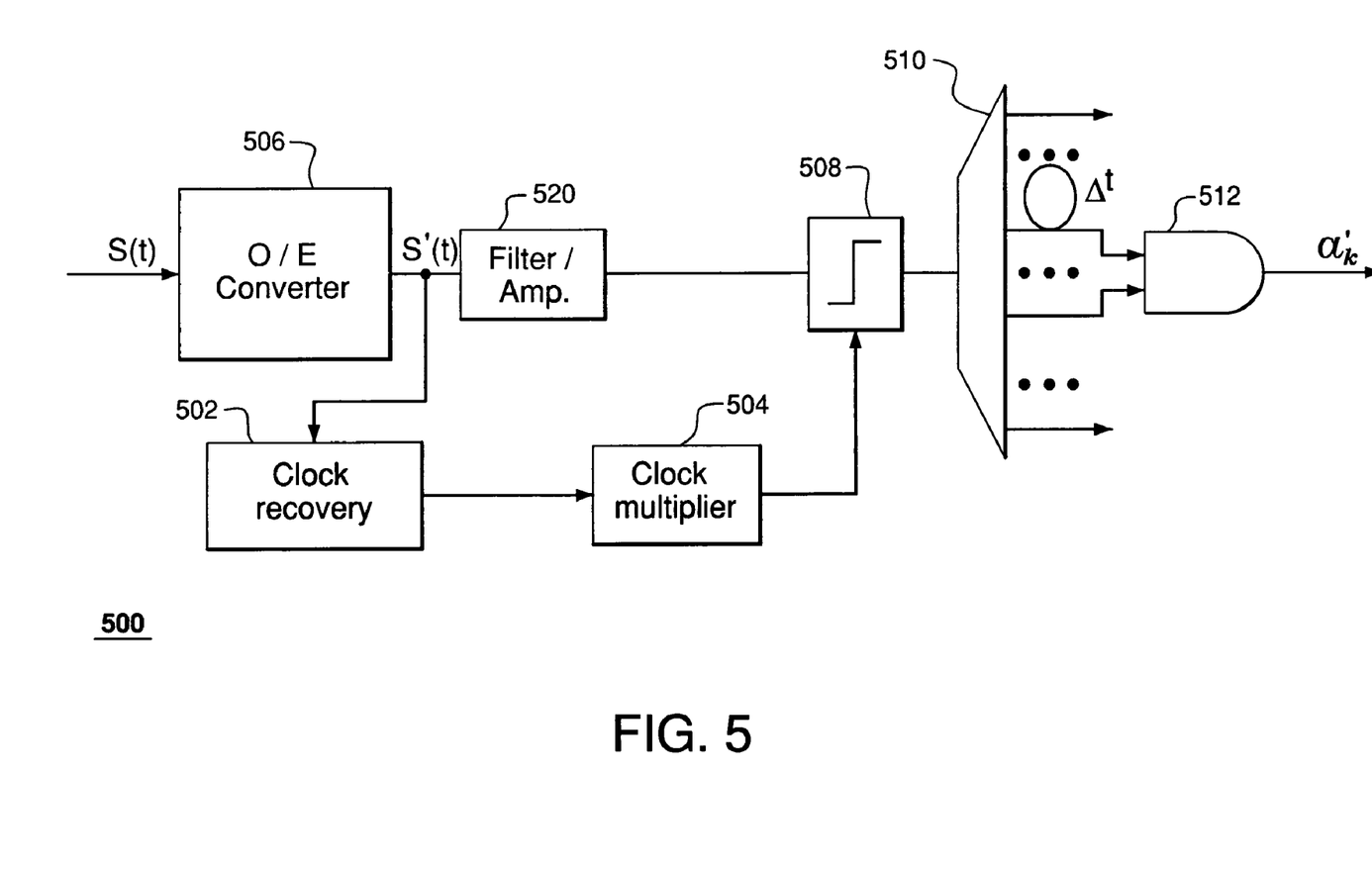
FIG. 5 shows a block diagram of a receiver that can be used in the system of FIG. 1 according to one embodiment of the present invention.

FIG. 5 shows a block diagram of a receiver 500 that can be used as receiver 108 in system 100 according to one embodiment of the present invention. Similar to receiver 200 of FIG. 2, receiver 500 is adapted to receive optical duobinary signal S(t) and convert it into a corresponding binary sequence $\alpha'_k$. However, receiver 500 implements dual-sampling processing in accordance with an embodiment of the invention.

Receiver 500 has an O/E signal converter 506 that is similar to converter 206 of receiver 200. The output of O/E signal converter 506 is optionally filtered/amplified with a filter/amplifier 520 and applied to a decision circuit 508. To provide an appropriate time reference for decision circuit 508, receiver 500 has a clock recovery circuit 502 and a clock multiplier 504. Circuit 502 processes signal S'(t) to generate a first clock signal synchronized with signal S'(t). Clock multiplier 504 then multiplies the frequency of the first clock signal and generates a second clock signal applied to decision circuit 508. In a representative implementation of receiver 500, the second clock signal has a frequency value four times that of the first clock signal.

Decision circuit 508 uses clock pulses of the second clock signal to sample the received signal. More specifically, for each clock pulse, decision circuit 508 generates a signal sample (integration result), compares it with a decision threshold value, and outputs a binary value corresponding to the comparison result. Sampling windows of decision circuit 508 are aligned with respect to the signal such that, for each signaling interval, two sampling windows correspond to sampling windows M1 and M2 shown in FIG. 3A. As a result, the bit stream at the output of decision circuit 508 has bits carrying bit estimate values corresponding to sampling windows M1-M2 and described above in the context of FIGS. 3 and 4. These bits are however interleaved with other bits not related to sampling windows M1-M2.

To separate the bits carrying bit estimate values from the rest of the bit stream output by decision circuit 508, receiver 500 has a de-multiplexer 510 having a number of output ports equal to the number of signal samples taken by decision circuit 508 per signaling interval. Therefore, each output port of de-multiplexer 510 receives one bit from the bit stream during each signaling interval, with two particular output ports of de-multiplexer 510 receiving the bits carrying bit estimate values for sampling windows M1-M2. In one embodiment, these two particular output ports are coupled to an "AND" gate 512, while the remaining output ports are not utilized. Gate 512 is adapted to apply an "AND" function to the bit estimate values and generate sequence $\alpha'_k$ as described above in the context of FIG. 3. Note that an appropriate time-delay element, $\Delta t$, is inserted between gate 512 and the output port of de-multiplexer 510 corresponding to sampling window M1 (see also FIG. 3A) to compensate for the relative time delay between sampling windows M1 and M2.

Figure 6:
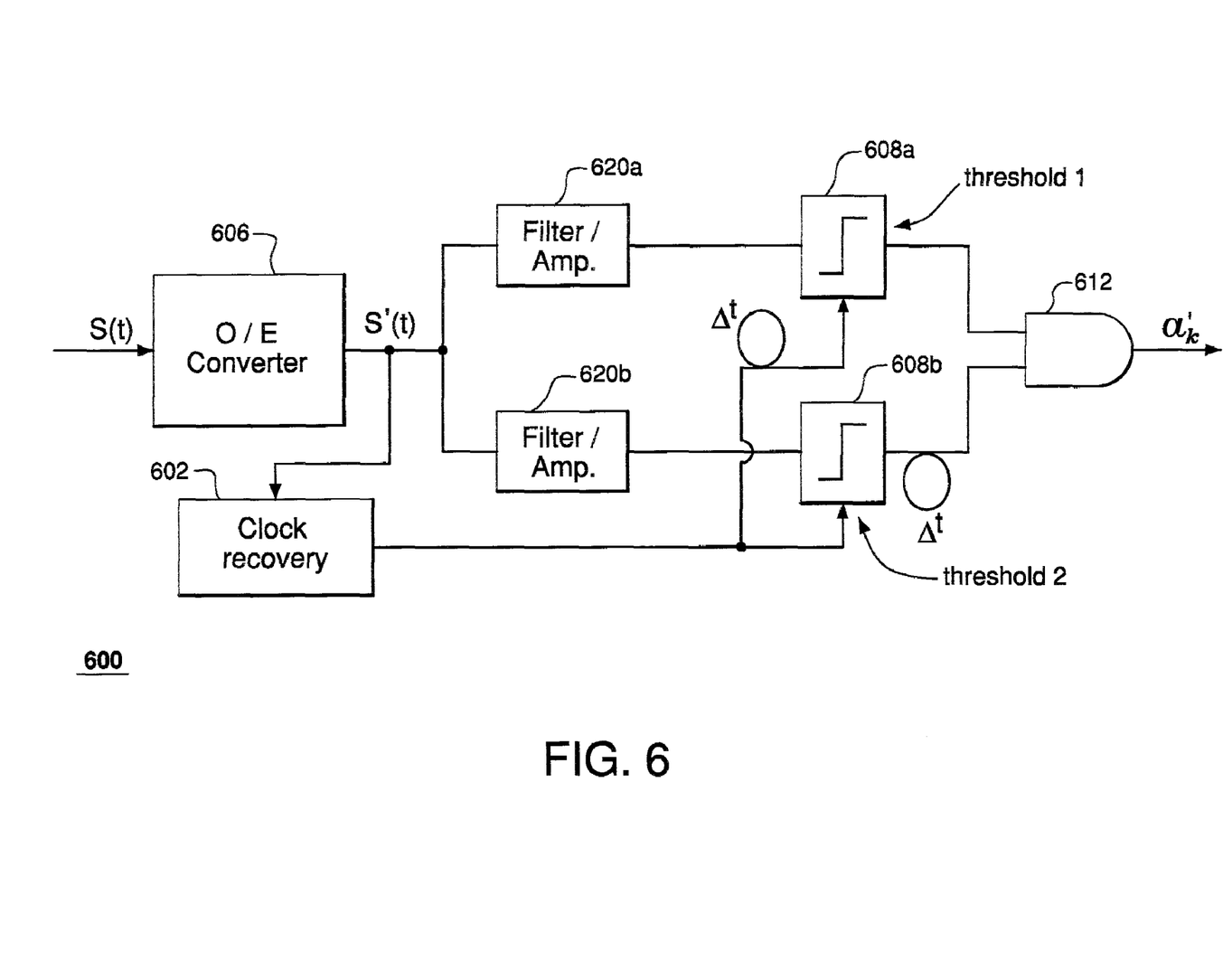
FIG. 6 shows a block diagram of a receiver that can be used in the system of FIG. 1 according to another embodiment of the present invention.

FIG. 6 shows a block diagram of a receiver 600 that can be used as receiver 108 in system 100 according to another embodiment of the present invention. Similar to receiver 500 of FIG. 5, receiver 600 implements dual-sampling processing and is adapted to convert an optical duobinary signal S(t) into a corresponding binary sequence $\alpha'_k$. However, instead of the serial sample processing technique realized in receiver 500, receiver 600 implements a parallel sample processing technique.

Receiver 600 has an O/E signal converter 606 and a clock recovery circuit 602 that are similar to O/E signal converter 506 and clock recovery circuit 502, respectively, of receiver 500. The output of O/E signal converter 606 is optionally filtered/amplified with filters/amplifiers 620a-b and applied to decision circuits 608a-b, each of which is similar to decision circuit 508 of receiver 500. However, unlike decision circuit 508, decision circuits 608a-b operate directly at the clock frequency generated by clock recovery circuit 602 without any frequency multiplication. Each decision circuit 608 generates a signal sample (integration result) using a relatively short sample window, compares the sample with a corresponding decision threshold value, and outputs a binary value corresponding to the comparison result. Note that decision circuits 608a-b may or may not have the same decision threshold value.

A first time-delay element, $\Delta t$, is inserted between clock recovery circuit 602 and decision circuit 608a, while no such time-delay element is present between clock recovery circuit 602 and decision circuit 608b. This serves to introduce a desired time lag between the sampling windows of decision circuits 608a and 608b. These sampling windows are then aligned with respect to the signal to correspond to sampling windows M1 and M2 shown in FIG. 3A. Consequently, bit streams at the outputs of decision circuits 608a-b carry bit estimate values corresponding to sampling windows M2 and M1, respectively. The outputs of decision circuits 608a and 608b are coupled to an "AND" gate 612 adapted to apply an "AND" function to the bit estimate values and to generate sequence $\alpha'_k$ as described above. Note that a second time-delay element, $\Delta t$, is inserted between gate 612 and the output of decision circuit 608b to compensate for the time delay introduced by the first time delay element.

Figure 7:
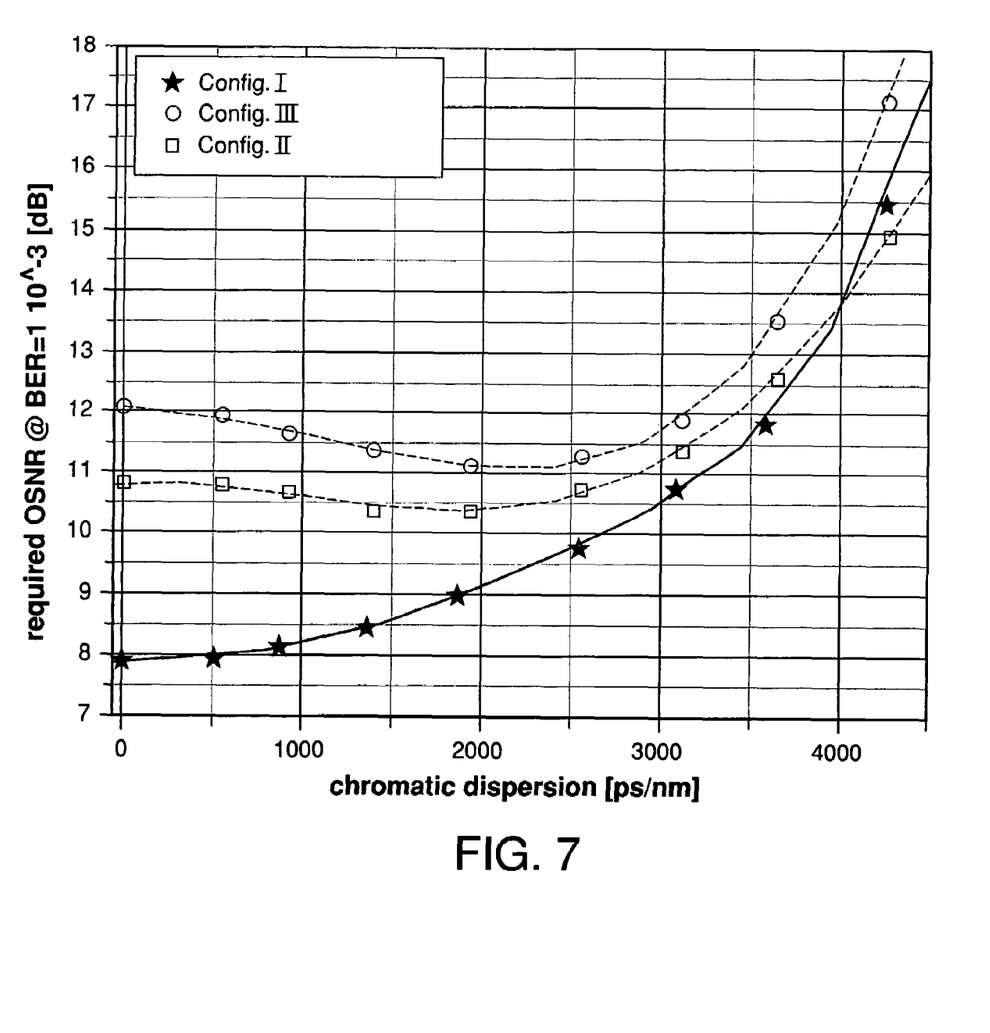
FIGS. 7-8 graphically compare performance characteristics of different configurations of the system shown in FIG. 1.
Figure 8A:
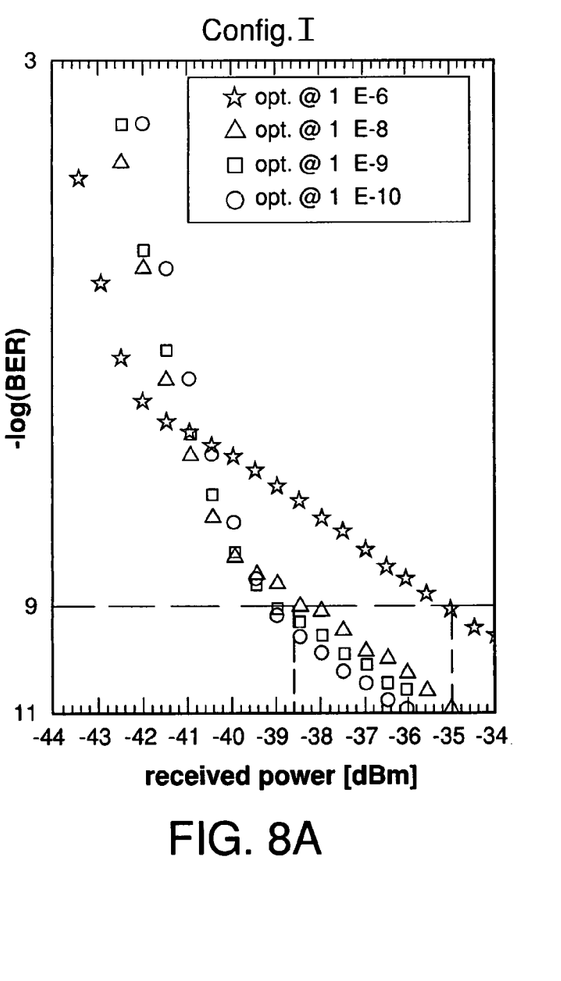
Figure 8B:
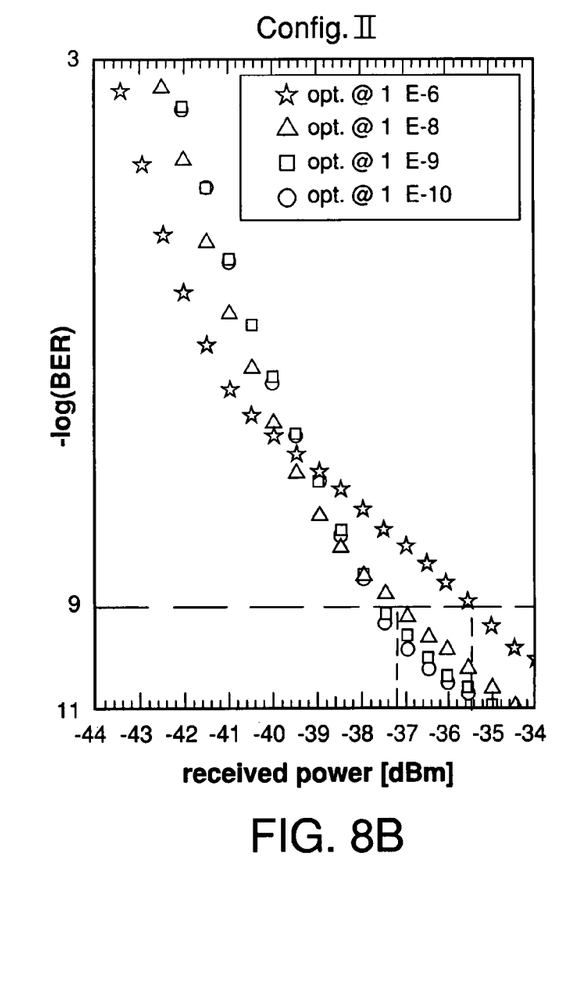

FIGS. 7-8 graphically compare performance characteristics of three different configurations of system 100. More specifically, FIG. 7 shows dispersion tolerance at bit error rate (BER) of $10^{-3}$, and FIGS. 8A-B shows dependence of BER on the power of signal S(t). In all configurations, transmitter 102 is a transmitter based on a Mach-Zehnder modulator operating at a bit rate of 10 Gb/s. In configuration I, receiver 108 is receiver 600 (FIG. 6). In configurations II and III, receiver 108 is receiver 200 (FIG. 2), which has a sampling window corresponding to sampling window D and C, respectively, shown in FIG. 3A.

Referring to FIG. 7, the difference between different curves at a particular dispersion value indicates a relative optical signal-to-noise ratio (OSNR) gain between different configurations of receiver 108 in system 100. As can be seen in FIG. 7, configuration I provides an OSNR gain of about 2-4 dB with respect to configuration III for chromatic dispersion values within the range from 0 to about 4000 ps/nm. Similarly, configuration I provides an OSNR gain of about 1-3 dB with respect to configuration II for chromatic dispersion values within the range from 0 to about 3000 ps/nm.

The data shown in FIGS. 8A-B were collected by first optimizing the receiver for a fixed nominal BER and then measuring the actual BER as a function of optical power at the receiver. Data points in FIGS. 8A-B show the actual BER while the nominal BER, for which the receiver was optimized, is indicated in the legend box. As can be seen from the comparison of FIG. 8A and FIG. 8B, for different actual BER values, configuration I provides significant gain over configuration II in terms of the optical power at the receiver. For example, for a BER value of $10^{-9}$, configuration I lowers the corresponding optical power by about 1 dB with respect to that in configuration II. In summary, embodiments of the present invention improve dispersion tolerance and reduce optical power corresponding to a selected BER value in duobinary transmission systems, thereby improving overall back-to-back (i.e., source-to-destination) performance of such systems.

While this invention has been described with reference to illustrative embodiments, this description is not intended to be construed in a limiting sense. Although the present invention is described with reference to duobinary signals, it can also be used for processing other types of signals, e.g., high-duty-cycle binary NRZ signals. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of signal processing, comprising:
   converting an optical signal having a duty cycle greater than one into an electrical signal having an amplitude corresponding to optical power of the optical signal;
   sampling the electrical signal using two or more sampling windows contained within a time interval having a one-bit length to generate two or more bit estimate values, wherein sampling the electrical signal comprises:
   integrating the electrical signal over a first sampling window to generate a first integration result;
   comparing the first integration result with a first decision threshold value to generate a first bit estimate value;
   integrating the electrical signal over a second sampling window to generate a second integration result; and
   comparing the second integration result with a second decision threshold value to generate a second bit estimate value; and
   applying a logical function to the two or more bit estimate values to generate a bit sequence corresponding to the optical signal, wherein applying the logical function comprises applying an "AND" function to the first and second bit estimate values to generate a bit of the bit sequence.

2. The method of claim 1, wherein:
   each sampling window has a width;
   the electrical signal has a series of waveforms comprising first and second pluralities of waveforms, wherein each waveform of the first plurality represents a binary "0" and each waveform of the second plurality represents a binary "1"; and
   for each sampling window:
   a waveform is integrated over the sampling window width to generate a corresponding bit estimate value; and
   the sampling window width is selected to reduce contribution of the second plurality of waveforms into integration results corresponding to the first plurality of waveforms.

3. The method of claim 1, wherein the first decision threshold value is different from the second decision threshold value.

4. The method of claim 1, wherein the optical signal is an optical duobinary signal.

5. The method of claim 1, comprising:
   generating a first clock signal based on the electrical signal;
   multiplying a frequency of the first clock signal to generate a second clock signal; and
   sampling the electrical signal at a sampling rate corresponding to the second clock signal to generate a bit stream carrying the first and second bit estimate values.

6. The method of claim 5, comprising:
   separating the first and second bit estimate values from the bit stream while discarding all other bits of the bit stream.

7. The method of claim 1, comprising:
   generating a clock signal based on the electrical signal;
   sampling first and second copies of the electrical signal at a sampling rate corresponding to the clock signal, wherein:
   the first copy is sampled to generate the first bit estimate value;
   the second copy is sampled to generate the second bit estimate value; and
   the first and second copies are sampled with a relative time delay.

8. An optical receiver, comprising:
   a signal converter adapted to convert an optical signal having a duty cycle greater than one into an electrical signal having an amplitude corresponding to optical power of the optical signal; and
   a decoder coupled to the signal converter and adapted to:
   (i) sample the electrical signal using two or more sampling windows contained within a time interval having a one-bit length to generate two or more bit estimate values;
   (ii) apply a logical function to the two or more bit estimate values to generate a bit sequence corresponding to the optical signal;
   (iii) integrate the electrical signal over a first sampling window to generate a first integration result;
   (iv) compare the first integration result with a first decision threshold value to generate a first bit estimate value;
   (v) integrate the electrical signal over a second sampling window to generate a second integration result; and
   (vi) compare the second integration result with a second decision threshold value to generate a second bit estimate value, wherein:
   the decoder comprises an "AND" gate adapted to apply an "AND" function to the first and second bit estimate values to generate a bit of the bit sequence.

9. The receiver of claim 8, wherein the optical signal is an optical duobinary signal.

10. The receiver of claim 8, comprising:
    a decision circuit coupled to the signal converter;
    a clock recovery circuit coupled to the signal converter and adapted to generate a first clock signal based on the electrical signal; and
    a clock multiplier coupled between the clock recovery circuit and the decision circuit and adapted to multiply a frequency of the first clock signal to generate a second clock signal, wherein the decision circuit is adapted to sample the electrical signal at a sampling rate corresponding to the second clock signal to generate a bit stream carrying the first and second bit estimate values.

11. The receiver of claim 10, comprising:
    a de-multiplexer having an input port and a plurality of output ports, wherein:
    the input port is coupled to the decision circuit;
    a first output port is adapted to receive a signal corresponding to the first bit estimate value; and
    a second output port is adapted to receive a signal corresponding to the second bit estimate value, wherein the "AND" gate is coupled to the first and second output ports.

12. The receiver of claim 8, comprising:
    first and second decision circuits, each coupled to the signal converter; and
    a clock recovery circuit coupled between the signal converter and the first and second decision circuits and adapted to generate a clock signal based on the electrical signal, wherein:
    each decision circuit is adapted to sample the electrical signal at a sampling rate corresponding to the clock signal;
    the first decision circuit is adapted to generate the first bit estimate value;
    the second decision circuit is adapted to generate the second bit estimate value; and the first and second decision circuits sample the electrical signal with a relative time delay.

13. The receiver of claim 12, wherein the "AND" gate is coupled to the first and second decision circuits.

14. The receiver of claim 12, wherein each decision circuit is adapted to:
integrate the electrical signal over a respective sampling window to generate a respective integration result; and
compare the respective integration result with a respective decision threshold value to generate a bit estimate value.

15. The receiver of claim 14, wherein the first and second decision circuits use different decision threshold values.

16. An optical communication system, comprising an optical receiver coupled to an optical transmitter via a transmission link, wherein the optical receiver comprises:
a signal converter adapted to convert an optical signal having a duty cycle greater than one into an electrical signal having an amplitude corresponding to optical power of the optical signal; and
a decoder coupled to the signal converter and adapted to:
(i) sample the electrical signal using two or more sampling windows contained within a time interval having a one-bit length to generate two or more bit estimate values;
(ii) apply a logical function to the two or more bit estimate values to generate a bit sequence corresponding to the optical signal;
(iii) integrate the electrical signal over a first sampling window to generate a first integration result;
(iv) compare the first integration result with a first decision threshold value to generate a first bit estimate value;
(v) integrate the electrical signal over a second sampling window to generate a second integration result; and
(vi) compare the second integration result with a second decision threshold value to generate a second bit estimate value, wherein:
the decoder comprises an "AND" gate adapted to apply an "AND" function to the first and second bit estimate values to generate a bit of the bit sequence.

17. The system of claim 16, wherein the optical signal is an optical duobinary signal.

18. The system of claim 16, wherein the optical receiver comprises:
a decision circuit coupled to the signal converter;
a clock recovery circuit coupled to the signal converter and adapted to generate a first clock signal based on the electrical signal;
a clock multiplier coupled between the clock recovery circuit and the decision circuit and adapted to multiply a frequency of the first clock signal to generate a second clock signal, wherein the decision circuit is adapted to sample the electrical signal at a sampling rate corresponding to the second clock signal to generate a bit stream carrying the first and second bit estimate values;
a de-multiplexer having an input port and a plurality of output ports, wherein:
the input port is coupled to the decision circuit;
a first output port is adapted to receive a signal corresponding to the first bit estimate value; and
a second output port is adapted to receive a signal corresponding to the second bit estimate value, wherein the "AND" gate is coupled to the first and second output ports.

19. The system of claim 16, wherein the optical receiver comprises:
first and second decision circuits, each coupled to the signal converter;
a clock recovery circuit coupled between the signal converter and the first and second decision circuits and adapted to generate a clock signal based on the electrical signal, wherein:
each decision circuit is adapted to sample the electrical signal at a sampling rate corresponding to the clock signal;
the first decision circuit is adapted to generate the first bit estimate value;
the second decision circuit is adapted to generate the second bit estimate value; and
the first and second decision circuits sample the electrical signal with a relative time delay, wherein the "AND" gate is coupled to the first and second decision circuits.

20. The system of claim 19, wherein:
each decision circuit is adapted to:
integrate the electrical signal over a respective sampling window to generate a respective integration result; and
compare the respective integration result with a respective decision threshold value to generate a bit estimate value; and
the first and second decision circuits use different decision threshold values.

* * * * *

UNITED STATES PATENT AND TRADEMARK OFFICE
CERTIFICATE OF CORRECTION

PATENT NO. : 7,643,761 B2
APPLICATION NO. : 10/782231
DATED : January 5, 2010
INVENTOR(S) : Moeller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this

Twenty-first Day of December, 2010

David J. Kappos
*Director of the United States Patent and Trademark Office*